Patented Jan. 16, 1934

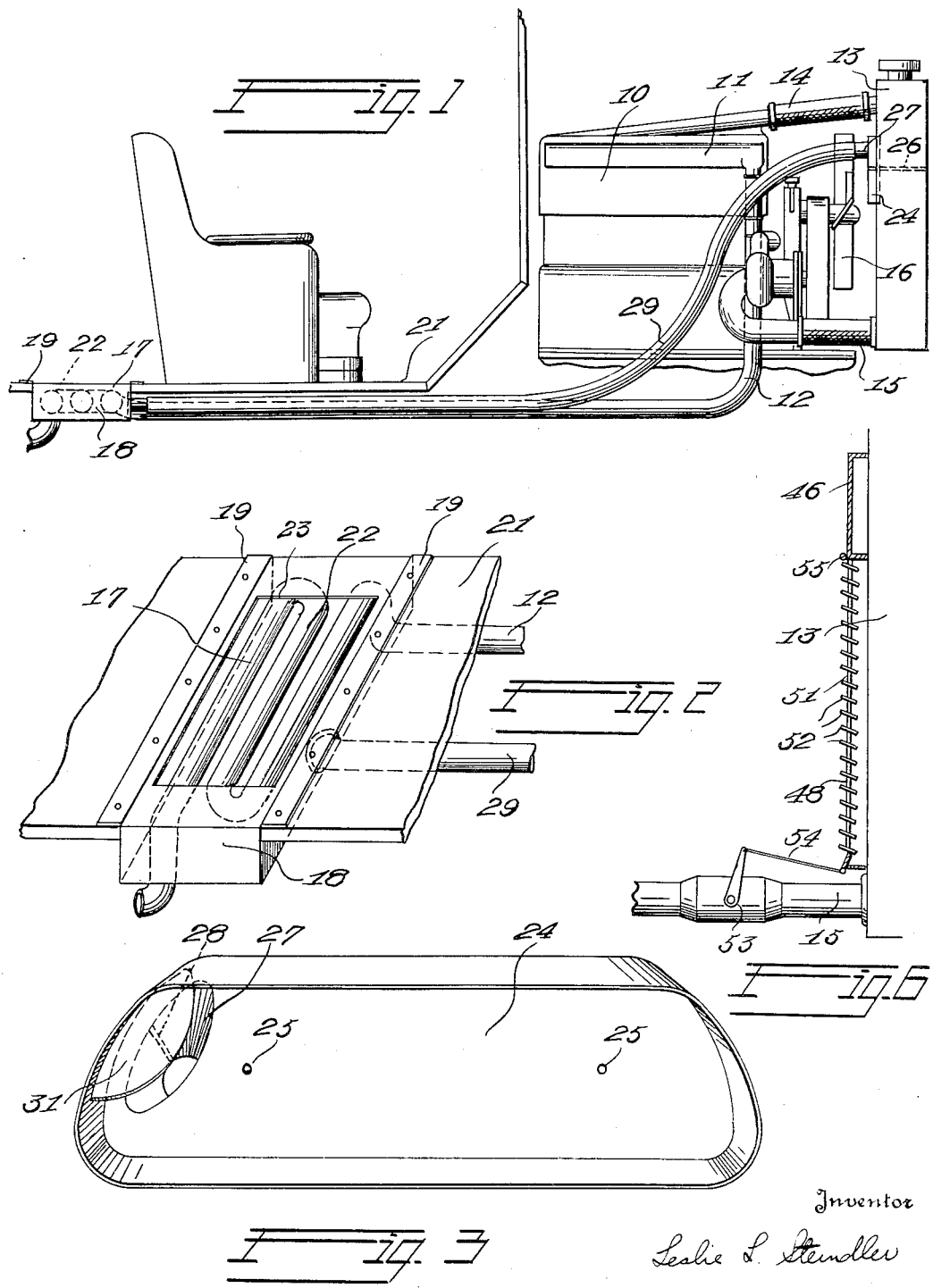

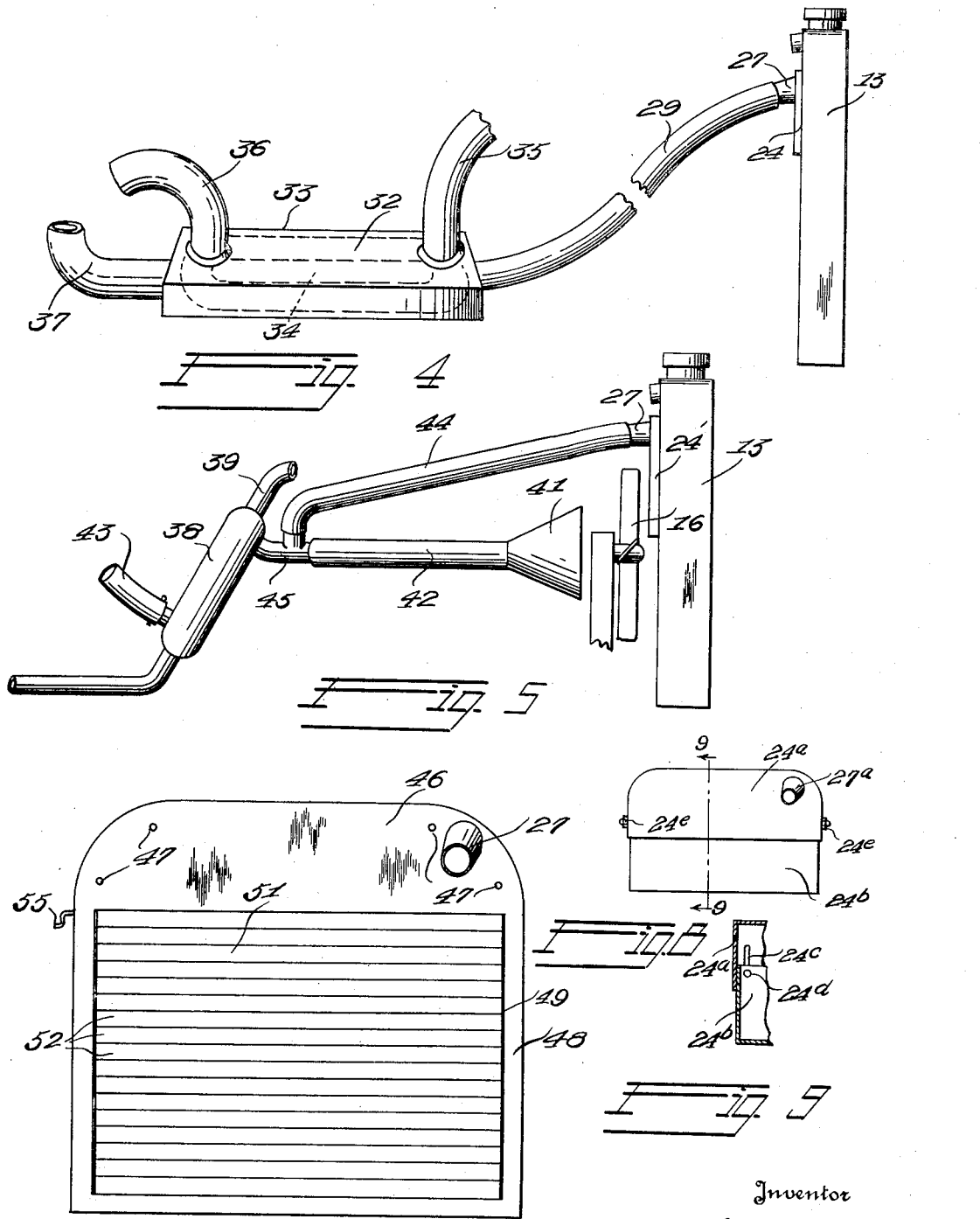

1,943,350

UNITED STATES PATENT OFFICE 1,943,350

AUTOMOBILE HEATING APPARATUS AND SYSTEM

Leslie L. Steindler, Mamaroneck, N. Y., assignor of one-fourth to Charles B. Waters, Montclair, N. J.

Application October 8, 1928. Serial No. 311,173

6 Claims. (Cl. 237—12.3)

The present invention relates to automobile heating apparatus and systems.

More specifically the invention relates to a heating system and apparatus utilizing as a heating medium hot water of the engine cooling system in addition to waste heat of the motor exhaust gases, the present invention being an improvement over that disclosed in my copending application Serial #267,338 filed April 4, 1928 and of which the present application is a continuation in part.

Heretofore, systems of heating automobile bodies have been devised that utilize the heat radiating from some portion of the exhaust system of the automobile. Such systems are objectionable because if a leak should develop in the portion of the exhaust system from which the heat is taken the carbon monoxide in the exhaust gases enters the body of the automobile causing poisoning of the occupants. It has also been heretofore proposed in systems of the type just referred to, to cause a fan to positively circulate air over the portion of the exhaust system utilized in heating the car. This arrangement tends to cause a supply of air to be continuously forced through the heating system with the result that even if a small quantity of exhaust gas should escape into the heating system the carbon monoxide present would be immediately diluted by a relatively large quantity of air thus minimizing the danger of poisoning the occupants of the car. However, even this arrangement is not entirely satisfactory because the fan forces air taken from beneath the hood of the automobile into the car with relatively great force. Due to the fact that the air is taken from beneath the hood of the automobile it is frequently impure. At the same time, such air is pumped into the car body with sufficient violence to cause an objectionable draft to the occupants, especially when the car is first started, and before the temperatures in the exhaust system have reached the values incident to normal operation.

It is a primary object of this invention to utilize a portion of the exhaust system of the automobile for some of the heat necessary to heat the body and to cause pure air taken from the front of the radiator and initially heated thereby to pass in contact with said portion under a draft induced solely by the motion of the vehicle, in order that an adequate supply of pure air may be passed around the exhaust system and into the car with a degree of movement that is not objectionable to the occupants thereof.

A further object of the invention is to provide a combined heating system utilizing a portion of the heat radiating from the engine radiator as it serves its cooling function, as well as a portion of the heat radiating from a part of the highly heated exhaust system while insuring a sufficient quantity of pure air to properly ventilate the car body at all times, thus at the same time insuring against the possibility of the occupants of the car being poisoned, should small quantities of carbon monoxide gas from the exhaust system accidentally enter the heating system.

A still further object of the invention is to provide an automobile heating system in which a substantial portion of the air passing through the automobile radiator due solely to the movement of the car is collected and conducted to the interior of the automobile body in such a way as to avoid direct draft from the open air at the front of the radiator into the car body.

A still further object of the invention is to provide an automobile engine cooling system with means to automatically initially secure and maintain a relatively high temperature in substantially all portions of the height of the radiator.

A still further object of the invention is to provide an automobile heating system, in which a substantial portion of the air passing through the radiator from the outside thereof is collected and passed into the car body, and in which means are provided to conveniently vary the area of the radiator from which the air is passed into the car body, whereby adjustment may be readily made in accordance with the season and the severity of the winter in the locality in which the system is put into use.

A further object of the present invention is the provision of a heating system and apparatus whereby air indirectly heated by the exhaust gases is conveyed to the automobile body under natural draft induced by movement of the automobile.

A still further object of the invention is the provision of a heating system and apparatus comprising means for conveying heated air to the automobile body under natural draft induced by movement of the automobile, and means for checking direct draft.

A still further object of the invention is the provision of a heating system and apparatus in which heated air is conveyed directly from the automobile cooling system to a heater of the exhaust gas type under draft induced by movement of the automobile.

A still further object of the invention is to provide a heating system for an automobile in which air is conveyed directly from the radiator of the engine cooling system to a heat radiator, of a honeycomb or other type, that is itself connected to the engine cooling system and utilizes and is heated by the water in that system.

A still further object of the invention is the provision of a heating system and apparatus comprising means for collecting heat radiated from the exhaust gases, means for conducting heated air from the automobile cooling system to said first named means under forced draft, and means for conducting heated air from the automobile cooling system directly to said first means under natural draft induced by movement of the automobile.

A still further object of the invention is the provision of a heating system and apparatus comprising means for collecting heat generated by the automobile cooling system and means for regulating the flow of air through said cooling system for maintaining an effective motor operating temperature of said cooling system and increasing the heat supply within said means.

With these objects in view, as well as other that will become apparent from the following disclosure and the appended claims, reference will be had to the accompanying drawings in which—

Figure 1 is a side elevational view more or less diagrammatic in nature illustrating the forward part of an automobile comprising the engine and cooling system therefor and showing the application of the invention.

Figure 2 is a fragmental perspective view of the car floor heater illustrated in Figure 1.

Figure 3 is a perspective view of a heat collecting box or casing forming one of the essential elements of my invention.

Figure 4 is a fragmental perspective view illustrating a modification of my invention.

Figure 5 is a fragmental side elevational view of a still further modification of my invention.

Figure 6 is a side elevational view partially in section of a combination heater and shutter unit adapted for application to the inside of a cooling radiator.

Figure 7 is a front elevational view of the structure illustrated in Figure 6.

Figure 8 is a rear view of a modified form of box in which the size of the box is made adjustable to vary the area of the radiator covered thereby.

Figure 9 is a section taken on the plane indicated by the line 9—9 on Figure 8.

Referring to the drawings by reference characters in which like characters designate like parts and referring first to Figures 1 and 2, 10 designates the engine of an automobile or motor vehicle which as in usual practice is provided with an exhaust manifold 11 to which is secured one end of exhaust pipe 12 which as is well known extends rearwardly beneath the car floor and to which is attached the muffler. Engine 10 also has associated therewith in well known manner the water cooling radiator 13 which is in communication with the engine cooling jacket through conduits 14 and 15 for the circulation of the cooling medium. A suitable fan 16 is interposed between engine 10 and radiator 13 and is driven from the engine in well known manner.

An exhaust type heater 17 is utilized as a part of the improved system though it should be understood that a heater utilizing water from the engine cooling system may be used. A honeycomb or similar water heater of this type may be used for example. If an exhaust type heater is used, said heater comprises a box 18 provided with flanges 19 for attachment to the automobile floor 21 at any convenient point, such as between the front and back seats as illustrated with the box projecting downwardly through the opening in the floor. A coil 22 is disposed within box 18 and is in communication with exhaust pipe 12 for the circulation of the heated exhaust gases therethrough in well known manner, the heat radiated from coil 22 being collected in box 18. A suitable shutter may be used to control the flow of heated air through said opening.

Associated with an exhaust heater arrangement just described, is a heater arrangement of the type disclosed in said co-pending application and which comprises a shallow metallic box or casing 24 with its forward face open and secured to the upper inner face of the radiator core as illustrated in Figure 1 in front of fan 16 in such manner that air gases from beneath the hood and drafts induced by the fan are excluded from the interior of the box. Box 24 is of a length substantially equal to the width of the radiator core and is of a depth sufficient to permit effective circulation of air through the cellular radiator core structure under the influence of fan 16 to cool the water under temperature conditions prevailing at the time of the year when the heater is in use. Box 24, as is illustrated in Figure 3 is provided with apertures 25 in the closed face thereof for the reception of suitable securing bolts 26 for securing the box in position as illustrated in Figure 1, suitable protecting washers as disclosed in said copending application may be employed in connection with bolts 26. If desired, the box 24 may be formed as a part of the sheet metal radiator casing in which event securing bolts 26 would be omitted.

Box or casing 24 is provided with a funnel shaped hose attaching member 27 which is preferably formed integrally with the casing and is disposed adjacent one end thereof in order that the hose hereinafter described may extend along one side of the engine. Preferably member 27 is slit as indicated at 28, Figure 3, with the slit ends overlapping in order that the outer end of member 27 may be yieldably contractible to facilitate insertion thereof into a hose end. While casing 24 is illustrated as of one piece it may be made sectional comprising telescoping sections as disclosed in said copending application for adjustment to adapt it to fit various width radiators.

Detachably connected to member 27 is one end of a flexible heat conducting conduit 29 whose opposite end is connected into box 18.

In operation of the apparatus just described, heat is radiated from coil 22 into box 18 from which the thus collected heat is permitted to enter the car body through a suitable adjustable shutter arrangement in opening 23 of box 18 for heating the car body.

This type of heater, in which the heat from the exhaust pipe is utilized, has been before proposed, but with such an arrangement alone the circulation of heated air around coil 22 is slow and as a consequence considerable time is required to heat the car body. Furthermore the air within the car body is not maintained in a desired pure condition due to slow circulation and the necessity of keeping the windows of the car closed in order to secure the desired temperature under such slow circulation. By utilizing the heater arrangement comprising box 24 and conduit 29 in conjunction with the exhaust heater arrangement not only, is additional heat supplied to box 18 but as the air during forward movement of the automobile enters box 24 through the radiator core structure and consequently through conduit 29 into box 18 under draft the heat collected in box 18 from coil 22 will be forced into the automobile body thus insuring a good, but not violent circulation of air within the body thus rapidly heating the body as well as maintaining the air within the body in a purer condition.

If desired a suitable valve operable from the dash may be disposed in conduit 29 to permit the air forced through box 24 to escape within the engine compartment, particularly when box 18 is closed in order to permit a constant flow of air through the complete area of the radiator core as disclosed in said co-pending application.

It will be noted that the air passing through the radiator core directly opposite the opening in member 27 will not have the velocity thereof substantially checked upon entering conduit 29 as a result of which, particularly in extremely cold weather the air passing through this area of the radiator core due to its velocity will not have sufficient time to become heated resulting in a cold draft in the car body.

In order to overcome this objection box 24 may be provided with a baffle 31 as illustrated in Figure 3 preferably extending inwardly from an end flange of box 24 in lapping relation to member 27 but spaced therefrom as well as from the open face of box 24 in order not to obstruct the circulation of air through the radiator core directly opposite baffle but preventing a high velocity of air at this point. If desired, however, baffle may be arranged so that it will be flush against the radiator. Baffle 31 may completely or only partially overlap the enlarged opening in spaced relation to the funnel shaped member 27 depending upon the extent of draft retardation desired at this point and depending upon the severity of the weather in the locality in which the heater is used.

In Figure 4 is illustrated a modified form of heater arrangement in which a superheater or exhaust heater 32 comprising a casing 33 and enclosed coil 34 is incorporated in the exhaust gas line of the motor at any suitable point other than that illustrated in Figure 1. Section 35 of this form of the invention is the pipe extending from the exhaust manifold and section 36 is a portion of the pipe leading to the muffler. The air within casing 33 is heated due to the heated gases passing through coil 34 and the thus heated air is conveyed to the car body by means of a suitable conduit 37.

Associated with the exhaust heater thus described is a combined draft inducer and air heater of the type described in connection with Figure 1 in which the conduit 29 leading therefrom is connected into casing 33 whereby the heated air collected in casing 24 passes through conduit 29 into casing 33 under draft whereby additional heated air is conveyed to casing 33 and from that casing into the car body. Not only is additional heat supplied to the car body but the heated air entering casing 33 through conduit 29 under a relatively slow draft causes the air within casing 33 to become heated in contacting with coil 34, thus providing a rapid heating arrangement as well as a relatively free circulation of air within the car body.

In Figure 5 is illustrated a further modified arrangement in which an exhaust heater 38 is suitably connected in the exhaust gas line 39 and air is forced into heater 38 by means of fan 16 which air is directed into a funnel shaped member 41 in communication with heater 38 by means of conduit 42. The air forced into heater 38 by means of fan 16 is heated within heater 38 by reason of the heated gases passing through exhaust pipe 39 and is conveyed to the car body through a suitable conduit 43.

In addition to the air supplied by fan 16 as just described, an air collector and heater of the character described in connection with Figure 1 is employed. Said heater is like that used in Figure 1, and functions in the same manner except that in this form of the invention casing 24' collects a greater volume of heated air due to the draft induced in conduit 44 by the flow through branch connection 45 to which conduit 42 in which a circulation induced by a fan is connected. This form of the invention is desirable when a rapid circulation is needed to maintain the temperature of the body.

In Figures 6 and 7 is illustrated a combination heater and shutter unit adapted to be mounted on the inside of the radiator core. Said unit may be employed with any of the heating systems above described if desired.

The combined heater and shutter unit comprises a casing 46 similar to casing 24 and adapted to be secured to the radiator core by means of suitable bolts extending through apertures 47 in the closed face of the casing and through the radiator core. Casing 46 has integrally or otherwise, associated therewith a frame member 48 defining with casing 46 a rectangular opening 49 for the reception of a suitable shutter 51. Shutter 51 is of a well known construction comprising a series of vertically or horizontally disposed louvers 52 adapted to be simultaneously moved to open and closed positions by means of suitable actuating means connecting the series of louvers.

Shutter 51 is adapted to control the circulation of air through the radiator for most effective operation of the motor as well as effecting a quicker heating of the car body.

It has heretofore been the practice to incorporate a thermostatic control in the top radiator water connection for controlling the temperature of the cooling medium in the radiator.

In accordance with my invention a thermostatic control 53 is incorporated in the lower radiator connection 15 at which point the water in the cooling system is always at the lowest temperature thus insuring an effective motor and heater operating temperature before permitting the circulation of cold air through the radiator core. Thermostatic control 53 is suitably connected to shutter 51 as indicated at 54 for operation thereof upon movement of the control. Shutter 51 may alternately be provided with an actuating connection 55 for manual control by suitable means accessible from the dash of the automobile for regulating shutter 51 independently of control 53.

In operation of the combined heater and shutter unit shutter 51 upon starting the motor or on extremely cold days is closed preventing a circulation of cold air through the radiator as a result of which the water in the cooling system will become heated rapidly and consequently an effective motor operating temperature will be quickly reached. Said temperature will be automatically maintained through regulation of shutter 51 and said shutter will not be opened by thermostatic control 53 until the water adjacent connection 15 or at the lowest point of the circulatory system has become heated thus insuring that the entire volume of water is thoroughly heated before said shutter is opened.

As the water in the upper part of the cooling system or adjacent connection 14 first becomes heated that portion of the radiator core covered by casing 24 will become heated before the lower portion of the radiator core and when shutter 51 is closed the upper portion of the radiator core will become more quickly heated by air passing through the upper portion of the radiator core into casing 24 and as shutter 51 does not open until the water adjacent the bottom of the radiator has become heated to a predetermined degree the water in the upper portion of the radiator core will be at a much higher temperature for most effective heating of the air passing into casing 24.

It will therefore be seen that by use of the combined heater and shutter a more effective operating temperature for the motor is secured as well as providing a more rapid and effective means for heating the car body.

The combined heater and shutter arrangement above described may be employed in connection with the draft heater arrangement disclosed in said co-pending application or it may be effectively employed in connection with the combined exhaust and draft heating arrangements above described.

In the form of the invention illustrated in Figures 8 and 9, the box disposed at the rear of the radiator is made adjustable to permit the area of radiator covered thereby to be varied in accordance with the temperatures prevailing in the locality in which the heating system is used. As shown in these figures, said box comprises two open sided pan-like members 24a and 24b, the member 24b being of less width than member 24a so that it may be telescopically associated therewith. In order to hold the members in adjusted position the ends of the member 24a are provided with slots 24c designed to adjustably receive the shanks of bolts 24d passing through openings in the ends of member 24b. The effective size of the box just described may be varied by loosening the nuts 24e threaded on the ends of bolts 24d. The sections 24a and 24b may then be adjusted relative to each other and the nuts 24e may be tightened to hold said sections in their adjusted position. The section 24a is provided with the outlet connection 27a corresponding to the connection 27 above referred to. If desired, an air collector and heater of the type just described may be employed in any one of the systems above described. Said air collector or heater provides a simple and ready way of adjusting the volume of air admitted into the body and at the same time serves to vary the cooling effect of the radiator on the water in the circulatory system of the engine.

While my invention has been described in detail it is not restricted to such detail, the scope thereof being determined by the following claims. Accordingly, what is desired to be secured by Letters Patent and is claimed as new is:—

1. A heating system for an automobile having an engine cooling system including a jacketed internal combustion engine, a cellular radiator, and connections between said jacketed engine and radiator, comprising means disposed at the rear of said radiator adjacent the top thereof and closing a portion of the cellular radiator at the top thereof so as to collect air passing through the upper portion of the radiator due to the motion of the automobile, an adjustable shutter disposed below said means so as to control the flow of air through the remainder of said radiator other than covered by said means, mechanism to control the extent of opening of said shutter to thereby vary the temperature of the liquid in the radiator and a conduit to convey air collected by said means to the interior of the automobile.

2. The combination defined in claim 1 including thermostatically controlled means to control said shutter in accordance with the temperature of the water in said cooling system.

3. The combination defined in claim 1 including a baffle disposed so as to prevent unrestricted flow of air from the top of said radiator into said conduit.

4. A heating system for an automobile having a radiator forming a part of the engine cooling system and having a cooling medium therein, comprising a frame attached to the rear of said radiator, a part of said frame to the rear of the upper portion of said radiator being formed to provide an imperforate wall closing said portion of the radiator against unrestricted flow of air therethrough when the automobile is in motion and formed to collect air flowing therethrough, the remainder of said frame being provided with an adjustable shutter to control the flow of air through the portions of the radiator not closed by said wall, mechanism to control said shutter whereby the temperature of cooling medium in the radiator may be varied by said shutter, and a conduit to convey air collected by said wall to the interior of the automobile.

5. The combination defined in claim 4 including baffle means connected to said wall and disposed to prevent the direct flow of air from said radiator to said conduit.

6. The combination defined in claim 4 in which said mechanism includes thermostatically controlled means to govern the adjustment of said shutter depending upon the temperature of the cooling medium at a selected point in said system.

LESLIE L. STEINDLER.